Feb. 24, 1953 J. E. TAYLOR 2,629,859
ELECTRICAL RATE GENERATOR
Filed Dec. 18, 1948 4 Sheets-Sheet 1
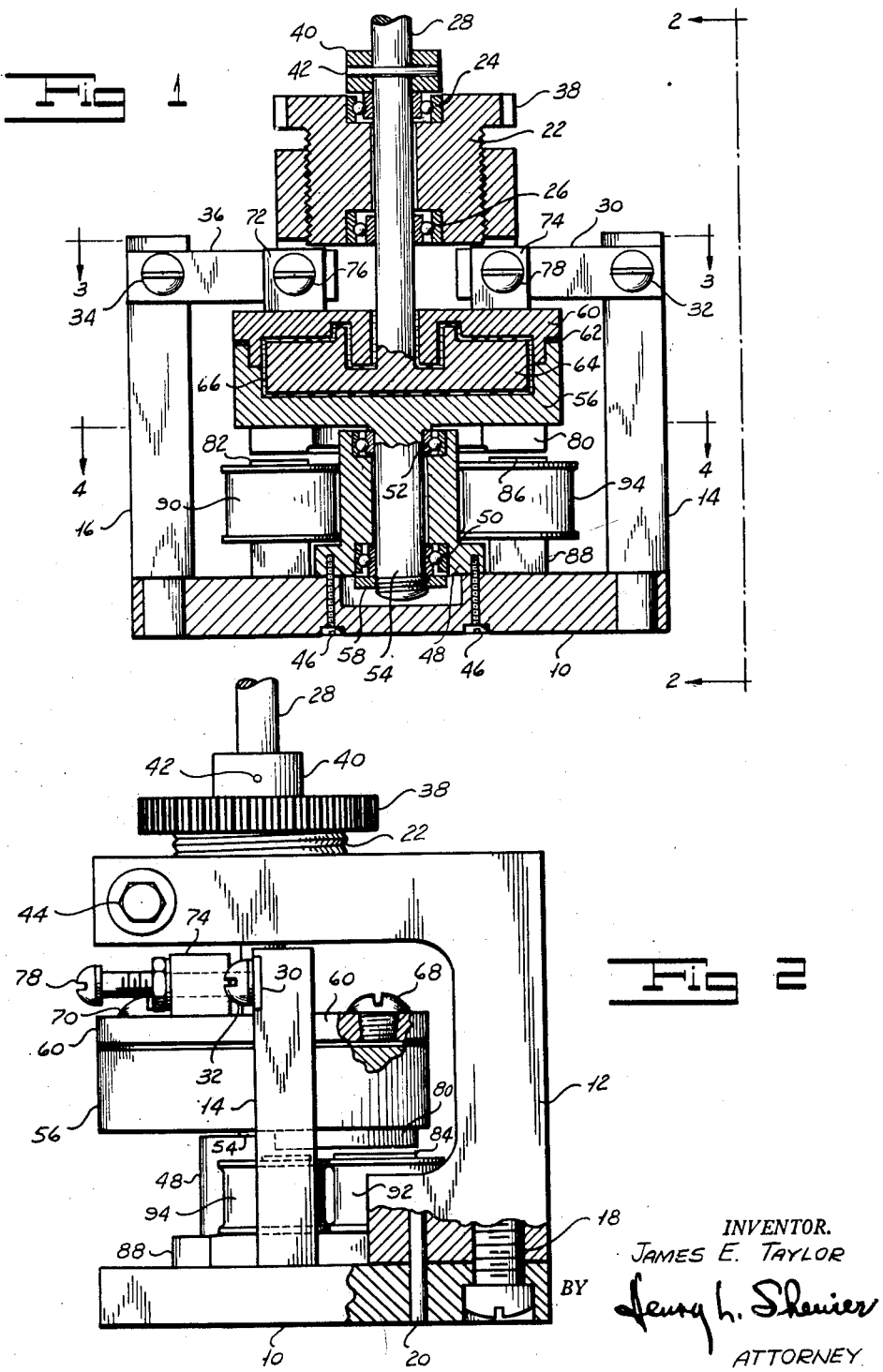
INVENTOR.
JAMES E. TAYLOR
BY
Henry L. Shenier
ATTORNEY Feb. 24, 1953

J. E. TAYLOR 2,629,859

ELECTRICAL RATE GENERATOR

Filed Dec. 18, 1948

INVENTOR.
JAMES E. TAYLOR

BY Henry L. Shenier

ATTORNEY

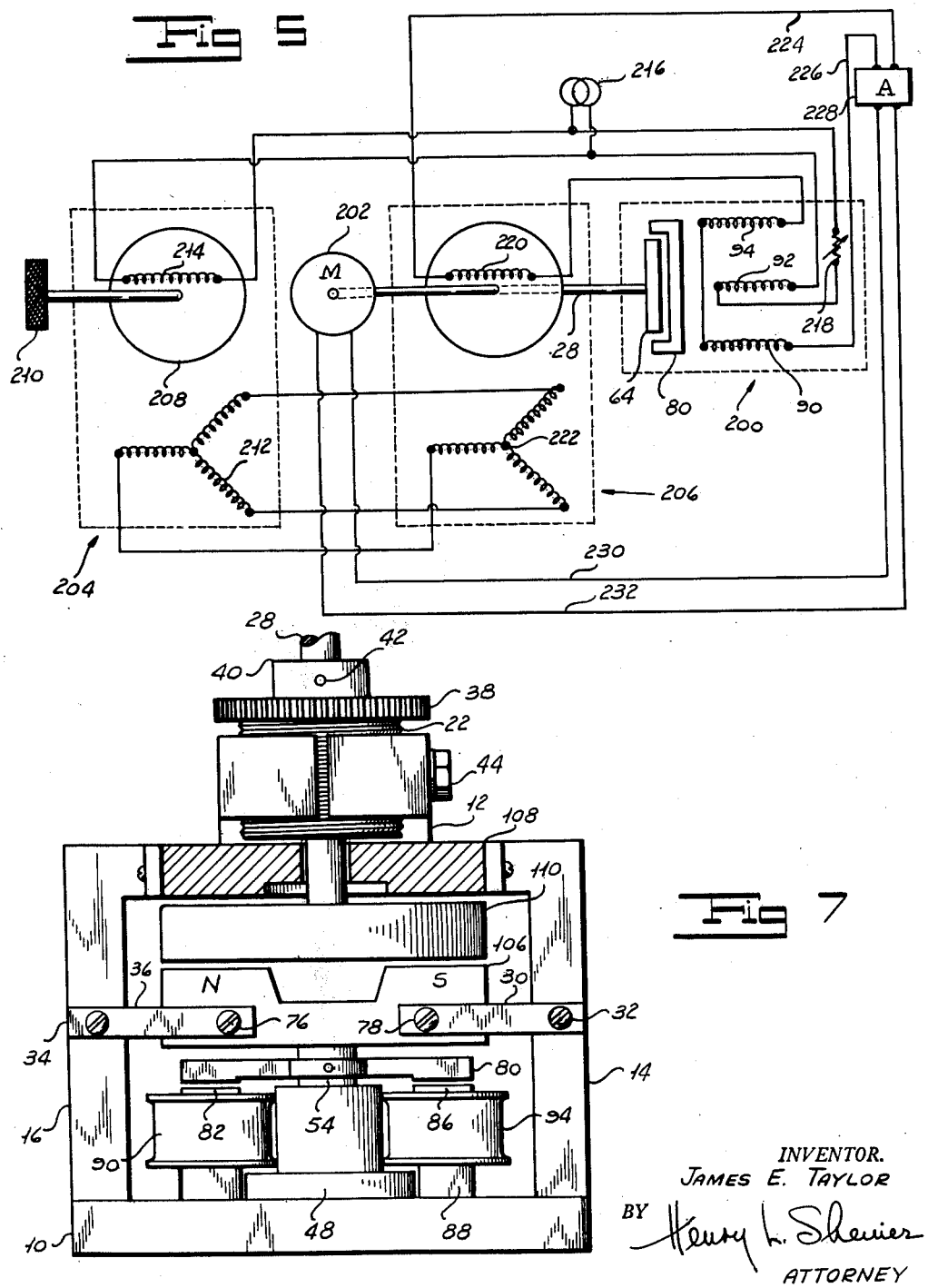

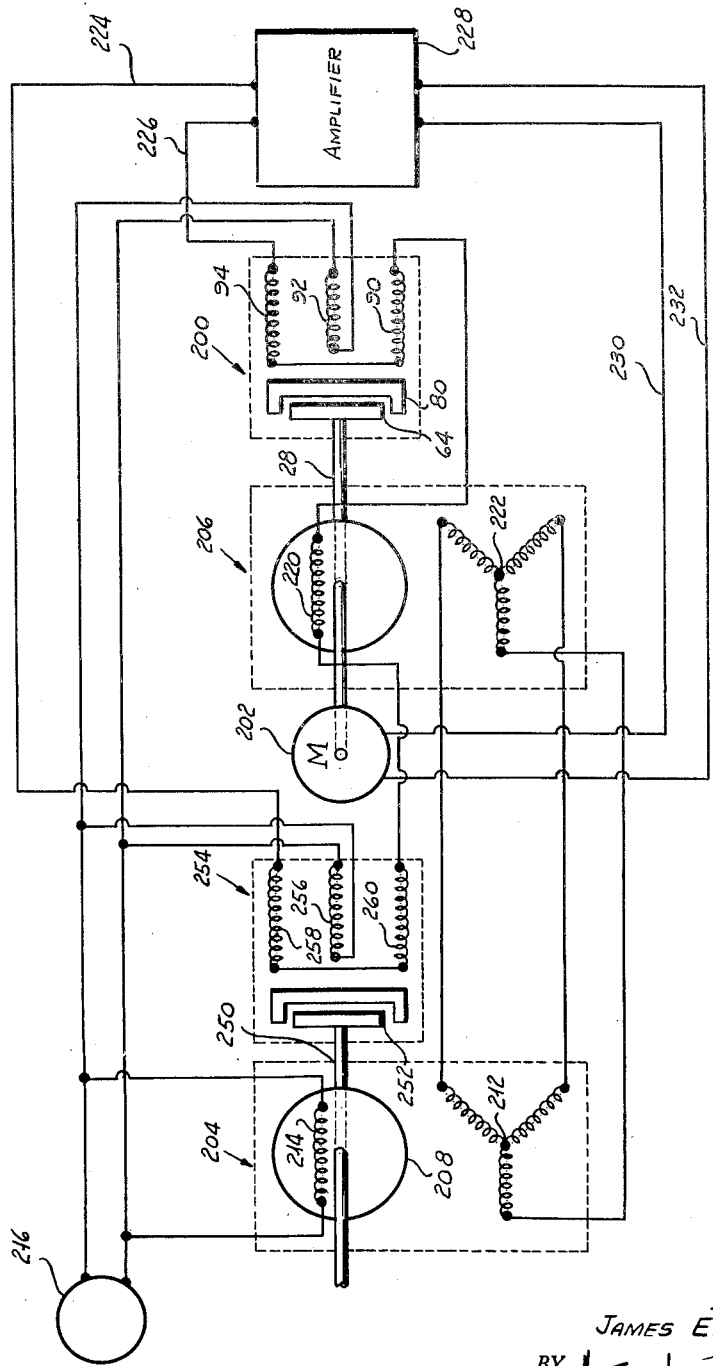

Patented Feb. 24, 1953

2,629,859

UNITED STATES PATENT OFFICE 2,629,859

ELECTRICAL RATE GENERATOR

James E. Taylor, New York, N. Y., assignor to The Norden Laboratories Corporation, White Plains, N. Y., a corporation of Connecticut Application December 18, 1948, Serial No. 66,121

4 Claims. (Cl. 336—30)

My invention relates to an electrical rate generator and more particularly to a device for the production of an electrical voltage varying as a function of relative velocity.

It is frequently desirable for many uses such as, for example, in electrically controlled servomotor systems to introduce a voltage which is a function of the relative velocity of mechanical motion as, for example, a voltage which is proportional to the amplitude of the rate of the rotation of the shaft and of a phase or direction which indicates the direction of the rotation of the shaft. This voltage can then be combined with a position signal of the shaft to produce a signal anticipating the position signal generated at the null position, which voltage will be proportional to the velocity of the approach to the null position. The use of an anticipation signal proportional to the velocity of the approach will improve the accuracy of servomotor systems by providing "anti-hunt" characteristics and prevent overrunning.

One object of my invention is to provide a novel means and method for generating an electrical voltage varying as a function of relative velocity.

Another object of my invention is to provide an electrical rate generator for producing electrical voltages varying as a function of relative velocity of mechanical motion in a simple, convenient, accurate and expeditious manner.

Another object of my invention is to provide an electrical rate generator which is inexpensive to construct and easy to maintain.

Another object of my invention is to provide an electrical rate generator adapted to indicate an electrical rate by the amplitude of an electrical voltage and the direction of motion by the phase or polarity of the electrical voltage.

Other and further objects of my invention will appear from the following description.

In the accompanying drawings which form part of the instant specification and which are to be read in conjunction therewith and in which like reference numerals are used to indicate like parts in the various views:

Figure 1 is the sectional elevation of an electrical rate generator containing one embodiment of my invention.

Figure 2 is a side elevation with parts in section, viewed along the line 2—2 of Figure 1.

Figure 5 is a diagrammatic view showing my electrical rate generator connected in a servomotor system to provide "anti-hunt" characteristics.

Figure 6 is a diagrammatic view showing a pair of my electrical rate generators connected in a servomotor system to provide "anti-hunt" characteristics with respect to both overrunning and lag.

Figure 7 is an elevation similar to Figure 1 with parts in section showing another embodiment of my electrical rate generator.

In general, my invention contemplates the provision of a receptacle rotatably mounted and biased to assume a neutral position. The receptacle contains a viscous liquid in which is mounted a disk connected to the rotating part which is to generate the desired rate. The receptacle carries an armature in proximity to a semicircular E-transformer having three coils wound on cores. Two of the coils are connected in series opposition and one of the coils is provided with an exciting current. The displacement of the container will be a function of the velocity of the rotating disk. The construction is such that the displacement of the container will generate an electrical potential varying in amplitude as the amount of displacement and in phase as the direction of the displacement.

Figure 3:
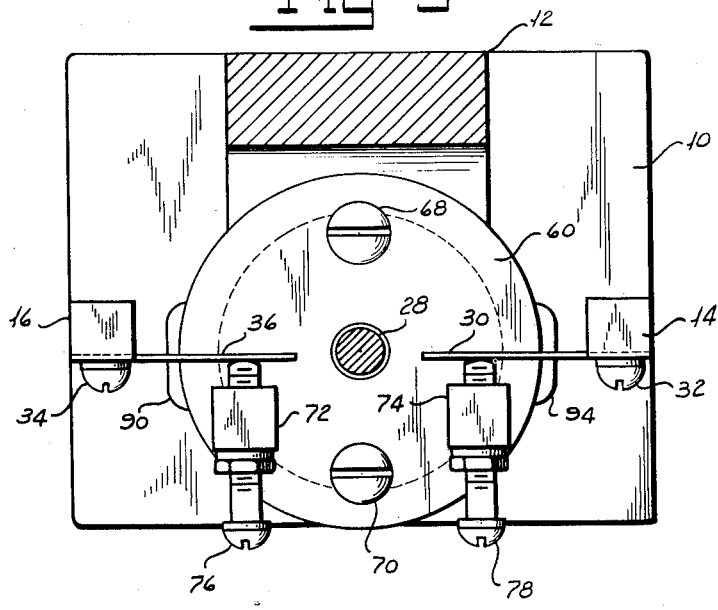
Figure 3 is a sectional plan view taken along the line 3—3 of Figure 1.
Figure 4:
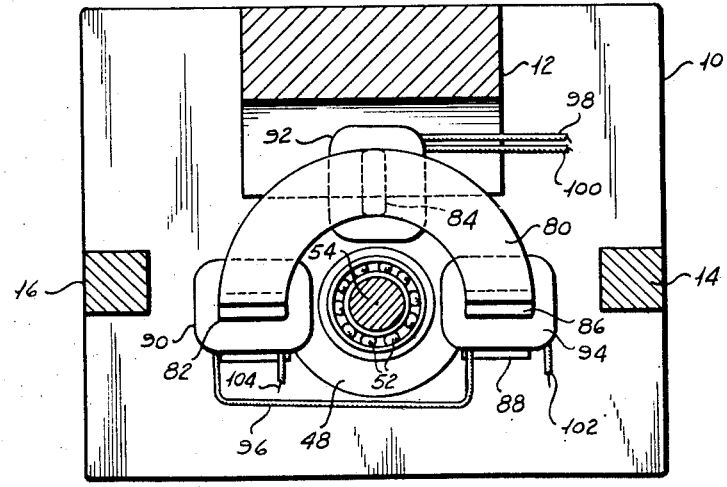
Figure 4 is a sectional plan view taken along the line 4—4 of Figure 1.

More particularly, referring now to the drawings and specifically Figures 1, 2, 3 and 4, a base plate 10 supports a bracket 12 and a pair of posts 14 and 16. The bracket is secured to the base plate 10 by machine screws 18 and dowel pin 20. The upper part of the bracket 12 is split and internally threaded to receive a bearing holder 22 in which is mounted a pair of ball bearings 24 and 26 rotatably supporting a shaft 28 which is connected to a rotating part the velocity of which is to govern the electrical rate to be generated. Secured to the posts 14 and 16 by machine screws 32 and 34 is a pair of leaf springs 30 and 36. The bearing holder 22 is provided with a plurality of angularly spaced lugs 38 adapted to receive a spanner wrench for the adjustment of the bearing position. A collar 40 is secured to the shaft 28 by a pin 42. A bolt 44 is adapted to clamp the bearing holder member 22 in the adjusted position. Secured to the base 10 by machine screws 46 I provide a lower bearing holder 48 carrying ball bearings 50 and 52 which rotatably support a shaft 54 which is formed upon a housing 56 made of any suitable nonmagnetic metal. The lower end of shaft 54 is threaded to receive a securing nut 58. The housing 56 is provided with a cover 60 secured to the housing 56 in any suitable manner. A gasket 62 seals the cover to the housing 56. The lower end of shaft 28 is formed with a disk 64 and adapted to rotate within the housing 56. The cover 60 and the disk 64 are formed to provide a labyrinth packing adapted to prevent the leakage of a viscous liquid 66 which is disposed within the pillbox housing 56. The viscous liquid may be of any suitable character. Its choice is governed by the desired viscosity and by the characteristic of having a level viscosity index. For slow speeds a more viscous liquid will be chosen. For high speeds a less viscous liquid should be used. I have found that the silicone oils are excellent for my purpose. The cover 60 is provided with a pair of openings closed by plugs 68 and 70 adapted to act as filling and vent openings for the insertion or removal of the viscous liquid 66. The cover 60 is formed with a pair of lugs 72 and 74 which carry a pair of adjusting screws 76 and 78 by which the housing 56 may be adjusted to bring the armature 80, carried by the housing 56, into the neutral or null position. The armature 80 is made of magnetic material and positioned closely adjacent the pole pieces 82, 84 and 86 carried by a core member 88. A coil 90 is wound about the pole piece 82. A coil 92 is wound about the pole piece 84, and a coil 94 is wound about the pole piece 86. The core member 88 is secured to the base 10 made of nonmagnetic material in any appropriate manner.

Coils 90 and 94 are connected in series opposition by the conductor 96. The coil 92 is adapted to be excited from a suitable alternating current source not shown through conductors 98 and 100.

The operation of the rate generator shown in Figures 1, 2, 3 and 4 will be readily understood from the construction. The disk 64 rotates with the shaft 28 and produces a viscous drag torque upon the rotatably mounted receptacle 56 due to the velocity gradient existing across the viscous fluid in the space between the disk 64 and the internal walls of the housing 56. This torque rotates the housing 56 against the action of either spring 30 or spring 36 depending upon the direction of rotation. The angular displacement of the housing 56 around its shaft 54 will be a function of the viscous drag torque, which is in turn dependent upon the speed of rotation of the shaft 28. The action of the E-transformer, it is believed, will likewise be clear to those skilled in the art. Coils 90 and 94 are connected in series opposition, the output signal being taken off across points 102 and 104. The exciting potential is applied through coil 92 across the terminals 98 and 100. Coil 92 acts as the primary winding of the transformer. The voltage induced in either secondary coil 90 or in secondary coil 94 will vary inversely as the armature air gap at that coil. Therefore, when the armature is centrally positioned the voltage induced in coils 90 and 94 will be equal since the air gaps will be equal. Since the coils are connected in opposition the resulting output voltage will be at a null value. Any displacement of the armature 80 from the null position will produce a resultant output voltage which is dependent in amplitude upon the magnitude of the displacement and in phase upon the sense of the displacement. Since the output voltage from the assembly will be a function of the viscous drag torque, which is in turn a function of the rate of rotation of the input shaft, the output voltage will generate a rate which is a function of the velocity of the input shaft.

Referring now to Figure 7 in which I have shown another embodiment of my invention, instead of the housing 56 and the creation of torque by the use of viscous fluid drag I employ drag created by magnetic eddy currents. The shaft 54 which is rotatably mounted in the bearing assembly 48 carries the armature 80 and a permanent magnet 106. The posts 14 and 16 carry a soft iron member 108 to provide a magnetic path for the flux of the magnet 106. The disk 64 is replaced by a disk 110 of copper or silver, the requisite being that the disk be a good conductor and of nonmagnetic metal. It is understood that instead of a permanent magnet 106 an electromagnet may be employed in which current is supplied through brushes. The rotation of the disk 110 in the magnetic field produces an eddy current reaction torque which rotates the magnet against the action of either spring 36 or 30 depending upon the direction of rotation, similar to the action described above. In this embodiment of my invention the torque and, therefore, the magnet and armature displacements, are a function of the rate of rotation of the shaft 28.

Referring now to Figure 5, I have shown an application of my rate generator to a servomotor system in which my rate generator in indicated generally by the reference numeral 200, the coils 90, 92 and 94 being shown as inductances, the armature 80 being shown diagrammatically, and the disk 64 being likewise so shown. The shaft 28 is rigidly coupled to the output shaft of a servomotor system which comprises a servomotor 202, a transmitting synchronous device indicated generally by the reference numeral 204 and a receiving synchronous device indicated generally by the reference numeral 206. The rotor 208 of the synchronous transmitter is adapted to be moved by the knob 210 to generate a position signal in the Y-wound stator winding 212. The position signal is induced in the stator 212 by the position of the rotor winding 214, the winding being excited by an alternating potential from the alternator 216 which excites the coil 92 of the rate generator as well. A variable resistor 218 is adapted to adjust the amplitude of the exciting potential impressed across the coil 92. The opposed secondary coils 94 and 90 of the rate generator are connected in series with the rotor coil 220 of the synchronous receiver 206 in such phase relation that the velocity voltage generated by the rate generator opposes the position voltage generated in the coil 220 from the signal generated in the Y-wound stator 222 of the synchronous receiver 206. The combined position and rate signal is introduced by conductors 224 and 226 to an amplifier 228, the output of which is led by conductors 230 and 232 to the servomotor 202 as the control potential therefor. By adjusting the value of resistor 218 the servomotor system of Figure 5 will behave well without hunting. The position signal generated by movement of coil 214 generates a signal in coil 220 which when amplified furnishes the signal to drive servomotor 202 to a like position. If the rate of following is too rapid there will be overrunning. The rate signal opposes the position signal and reduces the velocity of rotation of the servomotor. If the rate of following is too slow we have a condition of lag. In this case the rate signal is weaker so that it does not oppose the position signal as strongly, permitting a more rapid rotation of the servomotor. The alternate overrunning and lagging of the servomotor is the hunting action which is obviated by the use of my rate generator in the circuit shown in Figure 5.

Another application of my rate generator to a servomotor system is shown in Figure 6 in which I employ two rate generators instead of one. The synchronous transmitter is indicated by the reference numeral 204 and the synchronous receiver is indicated by the reference numeral 206 as in Figure 5. The rotor 208 of the synchronous transmitter is provided with a shaft 250 which is adapted to rotate the disk 252 of a second rate generator indicated generally by the reference numeral 254. The exciting coil 256 of the second rate generator is connected in parallel with the exciting coil 92 of the rate generator indicated generally by the reference numeral 200. The generating coils 258 and 260 of the rate generator 254 are connected in series opposition with the generating coils 94 and 90 of the rate generator 200, so that the resultant voltage from the two series-connected rate generator output signals is a function of the difference between the velocities of the input shaft 250 and the output shaft 28. The velocity difference signal is led by conductors 226 and 224 to the amplifier 228, the output of which is impressed by conductors 230 and 232 upon the control winding of servomotor 202. It will be clear that hunting will be avoided by the arrangement shown in Figure 6. If the shaft 28 moves faster than the shaft 250 the rate signal acting in the opposite direction will reduce the position signal in coil 220. If the shaft 28 moves more slowly than the shaft 250, that is lags, the rate signal generated by the rate generator 254 will increase the position signal. The effect, therefore, will be to compel shaft 28 to move at exactly the same rate as the shaft 250 without hunting, that is without overrunning or lagging.

The applications of my rate generator shown in Figures 5 and 6 are given as examples only, and not by way of limitation as it will be clear to those skilled in the art that my rate generator is susceptible of wide and general application whenever it is desired to produce a signal which is a function of the velocity of motion of a moving mechanical part.

While I have described my invention for use with an alternating current and the production of an alternating current voltage, it will be apparent to those skilled in the art that a direct current rate voltage can be produced by replacing the E-transformer with a tapped potentiometer the brush of which is carried by the housing 56 and operated by its motion. In this case the two segments of the potentiometer are supplied with voltages of opposite polarity so that motion of the brush in one direction from the tap will produce a voltage of one polarity and motion of the brush from the tap in the opposite direction will produce an output voltage of the opposite polarity. Thus connected a direct current voltage is produced which is a function of the velocity of the moving part.

It will be seen that I have accomplished the objects of my invention. I have provided a novel means and method for generating an electrical voltage which varies as a function of relative velocity. I have provided an electrical rate generator for producing electrical voltages varying as a function of relative velocity of mechanical motion which operates in a simple, convenient, accurate and expeditious manner. I have provided an electrical rate generator which is inexpensive to construct and easy to maintain. I have provided an electrical rate generator adapted to indicate an electric rate by the amplitude of an electrical potential and the direction of motion by the phase or polarity of the electrical potential. I have provided a rate generator producing a high output voltage and a low null voltage which has a low moment of inertia. The existence of the natural frequency and the damping constant as controllable parameters provides an additional facility of adjustment of my device.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention what I claim is:

1. An electrical rate generator including in combination a shaft adapted to be rotated as a function of the movement of a mechanical part, a disc carried by said shaft for rotation therewith, a housing, means for rotatably mounting said housing, said disc being positioned in said housing, a viscous fluid positioned in said housing and contacting said disc, means for biasing said housing to assume a neutral position and means responsive to the displacement of said housing from said neutral position upon rotation of said shaft for generating a signal of an amplitude as a function of the displacement of the housing from its neutral position and of a direction agreeable to the sense of the displacement.

2. An electrical rate generator as in claim 1 in which said viscous liquid comprises an oil having a level viscosity index.

3. An electrical rate generator as in claim 1 in which said viscous liquid comprises a silicone oil.

4. An electrical rate generator including in combination a shaft adapted to be rotated as a function of the movement of a mechanical part, means carried by the shaft for rotation therewith, a transformer having a pair of secondary coils connected in series opposition and a primary exciting coil, an armature providing a magnetic path for the flux generated in said secondary coils, means for rotatably mounting said armature, means for biasing said armature to a position providing magnetic paths of equal reluctance for the flux generated in said secondary coils, a housing, means for rotatably mounting said housing, means for supporting said armature on said housing, said rotatable shaft-carried means being positioned in said housing and a viscous liquid in said housing.

JAMES E. TAYLOR.

REFERENCES CITED

The following references are of record in the file of this patent:

UNITED STATES PATENTS

| Number | Name | Date |
| --- | --- | --- |
| 446,488 | Waring | Feb. 17, 1891 |
| 1,001,065 | Mursch | Aug. 22, 1911 |
| 1,166,765 | Kaminski | Jan. 4, 1916 |
| 1,183,530 | Brennan | May 16, 1916 |
| 1,482,167 | Varley | Jan. 29, 1924 |
| 1,668,457 | Kath | May 1, 1928 |
| 2,248,495 | Dupy | July 8, 1941 |
| 2,352,620 | Edwards | July 4, 1944 |
| 2,361,790 | Noxon | Oct. 31, 1944 |
| 2,379,417 | Conrad | July 3, 1945 |
| 2,399,675 | Hays | May 7, 1946 |
| 2,408,770 | Frische et al. | Oct 8, 1946 |
| 2,417,868 | Glass | Mar. 25, 1947 |
| 2,419,979 | Wilson | May 6, 1947 |
| 2,488,734 | Mueller | Nov. 22, 1949 |